United States Patent [19]

Murata

[11] 3,974,315

[45] Aug. 10, 1976

[54] CLOSED CELLULAR FUSED SILICA BODIES

[75] Inventor: Yorihiro Murata, North Tonawanda, N.Y.

[73] Assignee: The Carborundum Company, Niagara Falls, N.Y.

[22] Filed: Apr. 1, 1974

[21] Appl. No.: 456,575

Related U.S. Application Data

[63] Continuation-in-part of Ser. No. 388,688, Aug. 15, 1973, abandoned, which is a continuation of Ser. No. 137,627, April 26, 1971, abandoned.

[52] U.S. Cl. ............................... 428/212; 106/122; 252/62; 106/40 R; 428/220; 428/305
[51] Int. Cl.² .................... C04B 21/00; C04B 35/14
[58] Field of Search ......... 423/335; 106/40 R, 40 V, 106/69, 122; 428/212, 220, 305, 409

[56] References Cited
UNITED STATES PATENTS

| | | | |
|---|---|---|---|
| 2,310,432 | 2/1943 | Haux | 106/40 |
| 2,890,126 | 6/1959 | Ford | 106/40 |
| 2,890,127 | 6/1959 | Ford | 106/40 |
| 3,396,043 | 8/1968 | Winterburn | 106/40 |

*Primary Examiner*—L. Dewayne Rutledge
*Assistant Examiner*—Michael L. Lewis
*Attorney, Agent, or Firm*—David E. Dougherty; Raymond W. Green

[57] ABSTRACT

Cellular fused silica having a bimodal closed cell structure is produced by mixing finely divided silica with finely divided boron oxynitride as a cellulating agent and heating the mixture to a temperature of at least the melting point of the silica, whereby the silica melts and is cellulated by gas generated as a result of decomposition of the boron oxynitride. The cellular silica consists of a multiplicity of primary closed cells defined by a matrix consisting essentially of silica, the matrix also containing a multiplicity of secondary macroscopic closed cells which are at least an order of magnitude smaller than the primary cells. Cellular fused silica bodies according to the invention are characterized by superior mechanical strength in addition to extreme whiteness and high purity of color, as well as other desirable properties, and are particularly useful for high temperature thermal insulation. Carefully controlled and defined shapes having very smooth surfaces may be obtained.

5 Claims, No Drawings

CLOSED CELLULAR FUSED SILICA BODIES

CROSS REFERENCE TO RELATED APPLICATIONS

This is a continuation-in-part of copending application Ser. No. 388,688, filed Aug. 15, 1973, which is in turn a continuation of Ser. No. 137,627, filed Apr. 26, 1971, both now abandoned. See also copending U.S. Pat. application Ser. No. 487,952, filed July 12, 1974, entitled "Method for Production of Cellular Fused Silica" which describes and claims the method of production of the closed cellular fused silica bodies of the present invention; and copending U.S. Pat. application Ser. No. 288,831, filed Sept. 13, 1972, now abandoned which describes the preparation of boron oxynitride.

BACKGROUND OF THE INVENTION

The present invention relates to cellular fused silica, and more particularly to cellular fused silica having a bimodal closed cell structure. The invention also relates to a method of producing such cellular fused silica and to the compound boron oxynitride, which is especially useful as the cellulating agent employed in the method of the invention.

Fused silica possesses a number of highly desirable properties, such as relative chemical inertness and resistance to attack by moisture, high electrical resistivity, and impermeability to liquids and gases. It is particularly known for its desirable refractory qualities, including a low thermal coefficient of expansion, high temperature resistance and high thermal shock resistance. Accordingly, fused silica is an exceedingly useful material in many applications including, for example, chemical apparatus, thermocouple protection devices, components of electronic systems, furnace parts and the like.

Dense, relatively nonporous fused silica blocks and bricks have long been known, being useful for the construction of refractory linings and the like, especially in open hearth steel furnaces. Open cell fused silica, i.e., cellular fused silica containing a multiplicity of cells which are interconnected, is also well-known as a thermal insulating material. By virtue of its cellular structure, it is superior to the dense silica material in respect of its lighter weight, and also in having a lower thermal conductivity, which renders it more effective for thermal insulation. However, open cell fused silica is generally limited to use in dry environments, since its interconnected cells permit penetration of liquids. Moreover, open cell fused silica is generally characterized by low compressive strength and modulus of rupture as compared with the dense material, the strength decreasing with decreasing bulk density, thus precluding the use of open cell fused silica in many structural applications. For example, open cell fused silica available from The Carborundum Company under the trademark Silfrax having a bulk density of 0.5 g./cc. may have a compressive strength of only about 450 psi and a modulus of rupture of only about 150 psi.

Closed cell silica, i.e., cellular silica wherein most or all of the cells are noncommunicating, has heretofore been produced, overcoming the disadvantegous permeability of the open cell type, but such materials have heretofore been characterized by poor mechanical strength, just as the open cell type. For example, U.S. Pat. Nos. 2,890,126 and 2,890,127 disclose an improved method of producing cellular silica with a closed cell structure, but the highest compressive strength reported therein is 125 psi. Further, due to the use of carbon and silicon carbide containing foaming agents, the silica foam thus made is frequently quite dark in color, often approaching black. This greatly degrades thermal insulating ability, due to increased thermal conductivity.

SUMMARY OF THE INVENTION

In accordance with the present invention, there is provided a novel cellular fused silica having a very bright, clean white color due to the use of a foaming agent having no carbon or carbide content. The material has a bimodal closed cell structure, i.e., the material contains cells of two distinctly different size ranges and types, and substantially all of the cells are noncommunicating, i.e., not interconnected. The material consists of a multiplicity of relatively large closed cells, herein referred to as the primary cells, which are defined by a matrix which consists essentially of silica. However, the silica matrix itself additionally contains a multiplicity of relatively small but nonetheless macroscopic closed cells, herein referred to as the secondary cells, the secondary cells being substantially smaller than the primary cells, i.e., by at least one order of magnitude (e.g., a power of ten). Based upon microscopic measurements, the secondary cells in the silica matrix seldom exceed about 10 microns in size, their mean size being less than about 10 microns and usually considerably less than 10 microns. In contrast, the relatively large primary cells generally have a mean size in the range from about 0.5 mm. to about 5 mm. Both the primary and the secondary cells may vary considerably in shape from substantially spherical to highly irregular. In addition to having the advantage of being impervious to gases and liquids at room temperature and elevated temperatures, the cellular fused silica of the invention is characterized by a significantly higher compressive strength and modulus of rupture than closed cell silica materials heretofore available. Further, due to the absence of any carbonaceous blowing agent decomposition products, the whiteness, or brightness, of the fused silica is not discolored. This factor also results in lower thermal conductivity than previously achieved.

Bodies of cellular fused silica may be produced in accordance with the invention having bulk densities as low as about 0.4 g./cc. and up to about 1.2 g./cc. Bodies with considerably higher bulk densities may also be prepared, if desired, but there is seldom any advantage in such heavier bodies. Preferably, the bodies have a bulk density within the range from about 0.4 g./cc. to about 0.8 g./cc., such bodies providing a more or less optimum balance between light weight and mechanical strength. In general, the mechanical strength of the bodies tends to increase with increasing bulk density. Bodies having a bulk density of at least about 1.2 g./cc. may be produced having a compressive strength of at least about 4000 psi and a modulus of rupture of at least about 2000 psi. Bodies having a bulk density of about 0.4 g./cc. may be produced having a compressive strength of at least about 370 psi and a modulus of rupture of at least about 370 psi, while bodies having a bulk density of about 0.8 g./cc. may be produced having a compressive strength of at least about 2200 psi and a modulus of rupture of at least about 1300 psi.

The method of the invention is particularly advantageous in being simple, short and relatively inexpensive, and in permitting the reproducible production of bodies of any desired bulk density within the range mentioned. The method is based in part upon the use of a novel cellulating agent, boron oxynitride. In accordance with the method, a substantially homogeneous mixture is formed of finely divided silica and from about 0.1% to about 10%, based upon the total weight of the mixture, of finely divided boron oxynitride. The mixture is then heated to a temperature of at least the melting point of the silica employed, whereupon the silica melts. While the cellulating mechanism is not fully understood, the boron oxynitride decomposes to produce gas, presumably oxygen, which is entrapped within the molten silica and which forms closed cells therein, producing a cellulated mass which, upon cooling, forms a rigid body of closed cell fused silica. The boron oxynitride apparently loses oxygen during the heating and is converted in whole or in part to boron nitride, which remains in the product but which is unobjectionable in view of its excellent high temperature properties and lack of discoloration effect. When the boron oxynitride is employed in the mixture in amounts of less than about 0.1% or more than about 10%, no appreciable cellulation occurs. Maximum cellulation is observed when the boron oxynitride is employed in the preferred amount of from about 0.3% to about 3.0%. In general, the mean size of the primary cells tends to increase with increasing amounts of boron oxynitride employed, and for reasons mentioned hereinafter, relatively small mean sizes of the primary cells are preferred. Accordingly, it has been found most preferable to employ the boron oxynitride in an amount of about 0.5%, which is within the range which produces maximum cellulation but which is low enough to result in relatively small primary cells.

DESCRIPTION OF PREFERRED EMBODIMENTS

Boron oxynitride suitable for the practice of the present invention may readily be prepared by heating boric acid in an ammonia atmosphere, increasing the temperature gradually or stepwise to a final temperature within the range from about 700° to about 1300°C and continuing the heating at the final temperature until the desired composition is obtained. As the temperature rises, the boric acid slowly liberates water to produce boric oxide, which reacts slowly with the ammonia and is thereby nitrided to produce boron oxynitride. It will be apparent that boric oxide may be used as a starting material instead of boric acid, if desired. The temperature increase should be sufficiently slow as to avoid melting the boric oxide or intermediate products formed therefrom before the desired production of boron oxynitride occurs. Preferably, the boric acid is mixed with a suitable carrier material such as tricalcium phosphate to avoid agglomeration of the boric oxide, the tricalcium phosphate subsequently being leached out of the product, e.g., with dilute aqueous HCl. The preparation of boron oxynitride is illustrated in copending appliction Ser. No. 288,831, filed Sept. 13, 1972 now abandoned.

Boron oxynitride is a compound consisting of boron, oxygen, and nitrogen, but as with certain other compounds such as boron carbide, the proportions of its constituents are not rigorously governed by stoichiometry and the law of constant composition. Rather, boron oxynitride is a compound of somewhat variable composition in that the proportions of oxygen and nitrogen in boron oxynitride may vary within certain limits, subject to the limitation that for each mole of boron, there must be precisely 1 mole of nitrogen and oxygen taken together. Thus, the compound may be represented by the formula $BN_{1-m}O_m$.

A series of boron oxynitride compounds have been prepared and tested for their utility as cellulating agents. This series of compounds corresponds to boron oxynitride having the formula $BN_{1-m}O_m$ wherein $m$ is a number from about 0.05 to about 0.3 and they have been found to be particularly suitable as cellulating agents. Accordingly, it is preferred that the boron oxynitride employed in the method of the present invention contain at least about 3% oxygen and have a maximum oxygen content of about 18%, this range of oxygen content corresponding to the stated range for the values of $m$. It has been observed that maximum cellulation occurs when the boron oxynitride contains about 13% oxygen.

EXAMPLE

Finely divided boron oxynitride is intimately mixed with finely divided silica to obtain a substantially homogeneous mixture containing 1% boron oxynitride, based on the total weight of the mixture. The silica, of the quartzite crystal form, analyzes 99.6% $SiO_2$, and has a maximum particle size of about 50 microns, a mean particle size of about 8 microns, and a melting point of about 1680°C. The mixture is employed in a series of runs to produce cellular fused silica bodies according to the invention having various bulk densities. For each run, a graphite mold is employed with inner dimensions 22.8 × 11.4 × 6.4 cm., the inner surfaces being covered with a smooth coating of boron nitride, the mold being provided with a tightly fitting graphite cover, the inner surface of which is also covered with a smooth coating of boron nitride.

For each run, the mold is charged with the amount of mixture shown in the first column of the following table. The closed mold is then placed in a resistance heated carbon tube furnace and heated in a current of nitrogen to 1700°C, whereupon the mold is removed to the atmosphere and allowed to cool to room temperature, the resulting body then being removed from the mold.

The body produced in each run is a 22.8 × 11.4 × 6.4 cm. brick of cellular fused silica having a bimodal closed cell structure as described above, but having a very smooth, dense fused silica surface about 2 mm. thick which is substantially devoid of primary cells, each brick being extremely white and having very sharp edge and corner definition. The bodies consist essentially of silica, analyzing 99% $SiO_2$, and their properties are set forth in the following table.

TABLE I

| Amount of Mixture g. | Bulk Density g./cc. | Compressive Strength psi | Modulus of Rupture psi | Thermal Conductivity (600°C) cal./sec./cm.$^2$/°C/cm. |
| --- | --- | --- | --- | --- |
| 660 | 0.4 | 370 | 370 | 0.00071 |
| 1000 | 0.6 | 1330 | 830 | 0.00109 |
| 1330 | 0.8 | 2200 | 1300 | 0.00148 |

TABLE 1-continued

| Amount of Mixture g. | Bulk Density g./cc. | Compressive Strength psi | Modulus of Rupture psi | Thermal Conductivity (600°C) cal./sec./cm.²/°C/cm. |
|---|---|---|---|---|
| 2000 | 1.2 | 4000 | 2000 | 0.00233 |

In order to obtain a substantially homogeneous mixture of the silica and boron oxynitride with these materials in intimate contact, the boron oxynitride and silica should be finely divided, and generally the finer the better. It is preferred that the boron oxynitride have a maximum particle size of about 300 microns or less and a mean particle size of about 15 microns or less. The silica preferably has a maximum particle size of about 200 microns or less and a mean particle size of about 10 microns or less, and in general, the smaller the particle size, the smaller the primary cells.

Any of a wide variety of types of silica may be employed in the practice of the invention including, for example, quartz, tridymite, crystobalite, amorphous silica, fused silica powder and silicic acid. Relatively impure silica may be employed, if desired, although it is to be noted that the purity of the final product depends primarily upon the purity of the silica employed. In general, it is preferred to use relatively high purity silica since it is comparatively inexpensive and imparts its inherent desirable properties to the final product. Various oxidic impurities such as alumina, sodium oxide, potassium oxide, calcium oxide, ferric oxide, magnesia and titania are preferably avoided since they tend to increase the thermal conductivity of silica and also tend to reduce the melting point of the bodies produced. The silica is mixed with the desired amount of the boron oxynitride by any convenient technique such as dry or wet blending. Dry blending is most convenient although wet blending may in some cases give a slightly more intimate mixture.

If desired, the mixture may simply be placed in a tray and subjected to the heating step, or it may be compressed into a self-sustaining shape which is subjected to the heating step. In either case, cellulation and expansion will occur and a cellular fused silica body is obtained. Preferably, however, the mixture is placed in a suitable mold in order to produce a body having the desired shape. Suitable molds may be made of mullite, sintered alumina, sintered magnesia, boron nitride, refractory metals and the like. Carbon or graphite molds may also be employed, but since these materials tend to react extensively with the silica in the mixture, they are preferably coated on their inner surfaces with a material such as boron nitride. By employing molds of various shapes, cellular fused silica bodies of any of a wide variety of simple or complex shapes may be produced, such as blocks, bricks, pipes and the like. It has been found that the texture of the inner surfaces of the mold which come in contact with the bodies is accurately transferred to the corresponding outer surfaces of the bodies produced, and accordingly, it is preferred that the inner mold surfaces be as smooth as possible, in which case the surfaces of the resulting bodies are comparably smooth. Moreover, these smooth surfaces consist of dense fused silica having virtually no primary cells. Such smooth, dense surface layers may be up to several millimeters in thickness and are impervious to liquids and gases.

In accordance with a particularly preferred embodiment of the invention, a closed mold is employed, i.e., a mold of the desired configuration which has an opening to permit insertion of the mixture but which is provided with a cover for the opening, the assembly being mechanically strong enough to withstand the internal gas pressure generated during the heating step. By employing such closed molds, cellular silica bodies may be produced in various shapes and with any desired bulk density within the range from about 0.4 g./cc. to about 1.2 g./cc. or more. As long as the mold is charged with a weight of the mixture calculated to form a body having a bulk density of at least about 0.4 g./cc. if that weight occupied the entire volume of the mold, the mixture will cellulate and expand to completely fill the mold. If larger amounts of the mixture are employed, they necessarily produce bodies having proportionately higher bulk densities, since expansion beyond the confines of the mold is precluded. Accordingly, the bulk density of the final body is a function of the volume of the mold and the weight of the mixture placed therein, and cellular fused silica bodies having bulk densities from about 0.4 g./cc. to about 1.2 g./cc. or considerably higher may readily and reproducibly be made. The cellulated mass expands to contact the entire inner surface of the mold and its cover, and assuming that the entire inner surface is smooth, bodies may be produced in accordance with the invention of any desired bulk density within the specified range with their entire surface being smooth, dense and impervious. Closed rectangular molds may thus be employed to produce cellular fused silica bricks having exceptionally sharp edge and corner definition without any necessity for machining.

The heating step is carried out by heating the mixture to a temperature of at least the melting point of the silica employed. The melting point of silica is subject to some variation depending upon the type of silica and the nature of the impurities therein. Preferably a temperature from about 10° to about 50°C above the melting point of the silica is employed in order to favor uniform melting within a relatively short time. There is generally no advantage to employing higher temperatures, although much higher temperatures of 2000°C and higher may be employed, if desired. It should be noted, however, that the size of the primary cells tends to increase with increasing temperatures, as a result of the lower viscosity of the molten silica and the greater volume of the gas liberated by the cellulating agent, and thus unnecessarily high temperatures are preferably avoided. The more rapidly the mixture is heated to the desired temperature, the better, since the faster the heating rate, the smaller the primary cells tend to be. It will thus be apparent that, while any of a wide variety of furnaces may be employed which are capable of generating the requisite temperatures, it will be preferred to employ furnaces which are capable of such rapid heating. Insofar as the product is concerned, the atmosphere during heating is not critical, air, nitrogen, the inert gases and the like being equally suitable. When carbon or graphite molds are employed, however, it is generally desirable to carry out the heating step in a nonoxidizing atmosphere to avoid adverse effects on the mold, the same applying to carbon or graphite internal furnace parts.

After the desired temperature has been reached, the resulting cellulated mass is cooled, whereupon it forms a rigid body of cellular fused silica. The cooling is preferably carried out rapidly to avoid or minimize crystallization of the silica.

Chemically, the resulting bodies consist essentially of silica, although they may also contain impurities derived from the starting material as well as residual boron nitride from the cellulating agent. The bodies are generally very bright white. By employing a relatively small amount of the cellulating agent and by also employing highly pure silica, bodies may be produced in accordance with the invention which contain 99% or more silica. In general, the bodies of the invention have the chemical properties characteristic of silica, being stable to various acids and corrosive gases, even at elevated temperatures.

The cellular fused silica bodies of the invention have outstanding physical properties. They are impervious to gases and liquids, both at room temperature and at elevated temperatures. They have very low thermal expansion coefficients. Their thermal shock resistance is indicated by the fact that the bodies may be heated to 1700°C and abruptly immersed in water at room temperature without cracking, spalling or any other observable effect. The bodies have outstanding mechanical strength, the compressive strength and the modulus of rupture tending to increase with increasing bulk density and also tending to increase with decreasing size of the primary cells for any given bulk density. The bodies are also characterized by low thermal conductivity, which tends to decrease with decreasing bulk density and which is apparently relatively unaffected by the size of the primary cells. The various desirable properties render the bodies especially useful as high temperature refractory thermal insulation in such apparatus as industrial furnaces and kilns, coke ovens, reaction chambers and the like.

Percentages referred to herein are by weight except as otherwise indicated. Modulus of rupture and compressive strength is determined in accordance with A.S.T.M. Designation C133-55. The mean size of the primary cells is measured by the linear intercept method using a conversion factor 1.16. Bulk density is determined by weighing the specimen in air and in water.

While the invention has been described herein with reference to certain examples and preferred embodiments, it is to be understood that various changes and modifications may be made by those skilled in the art without departing from the concept of the invention, the scope of which is to be determined by reference to the following claims.

I claim:

1. A cellular fused body consisting essentially of $SiO_2$ and a fraction of boron nitride equivalent to from about 0.3 percent to about 3.0 percent by weight of boron oxynitride of the formula $BN_{1-m}O_m$ where $m$ is a number from about 0.05 to about 0.3, having a bimodal closed cell matrix structure of
   a. a multiplicity of primary closed cells having a mean size of from about 0.5 mm to about 5 mm; and
   b. a multiplicity of secondary closed cells having a mean size not exceeding 10 microns in size; said cellular fused body having a bulk density of at least about 0.4 g./cc. and a thermal conductivity at 600°C of not greater than 0.00233 cal.-/sec./cm.$^2$/°C/cm.

2. A cellular fused body as set forth in claim 1 having a smooth surface layer at least 2 mm thick which is substantially free of said primary closed cells having a mean size of from about 0.5 mm to about 5 mm.

3. A cellular fused body as set forth in claim 2 in the shape of a rectangular solid, 22.8 × 11.4 × 6.4 cm. brick.

4. A cellular fused body as set forth in claim 1 having a bulk density within the range from about 0.4 g./cc. to about 1.2 g./cc., a compressive strength of at least about 370 psi and a modulus of rupture of at least about 370 psi.

5. A cellular fused body as set forth in claim 4 having a bulk density of at least about 0.8 g./cc., a compressive strength of at least about 2200 psi and a modulus of rupture of at least about 1300 psi.

* * * * *